United States Patent Office 3,592,827
Patented July 13, 1971

3,592,827
PURIFICATION OF PYROMELLITIC DIANHYDRIDE
Richard I. Bergman, Princeton, N.J., assignor to Princeton Chemical Research, Inc., Princeton, N.J.
No Drawing. Original application June 30, 1965, Ser. No. 468,618. Divided and this application Oct. 28, 1968, Ser. No. 771,367
Int. Cl. C07c 63/32
U.S. Cl. 260—346.3          5 Claims

ABSTRACT OF THE DISCLOSURE

Recrystallization from or scrubbing with 1,4-dioxane in order to purify and decolorize, particularly improve the melt color, pyromellitic dianhydride.

---

This application is a division of application Ser. No. 468,618 filed June 30, 1965 now abandoned.

This invention relates to production of pyromellitic dianhydride. It more particularly refers to purification of pyromellitic dianhydride.

It is known to produce pyromellitic dianhydride by the air oxidation of tetraalkyl aromatic compounds, for example durene. This reaction is generally carried out in the vapor phase over a solid catalyst of the fixed or fluid bed type. The product is usually in the vapor phase and must be condensed therefrom for recovery purposes.

It is known that pyromellitic dianhydride finds its greatest present utility in the plastics industry. Therefore it is necessary that this product have the greatest possible purity, consistent with economics, and particularly that its color be as near to water-white as possible. This color, or lack of it, is most important both in the solid and in the melt state of the pyromellitic dianhydride.

The necessity and desirability of high purity and low color in pyromellitic dianhydride has been recognized by other workers in the past. For example U.S. Pats. 2,937,-189 and 3,236,885 deal with the production and purification of pyromellitic dianhydride. The earlier of these two patents shows treatment of pyromellitic acid, prior to dehydration thereof to the anhydride form, with activated carbon "to remove any organic impurities which may be present." There is also mentioned the possibility of treatment of the product with a cation exchange resin to remove any metals therefrom.

The latter of the two above-referred to patents deals with the purification of pyromellitic acid through the use of a water slurry of char (activated carbon) as the treating agent. This patent states that it is most desirable and in fact just about necessary to carry out the treatment at a temperature of at least about 200° C. at excess pressure sufficient to keep the water liquid. The recited preferred temperature range is 240 to 280° C.

Another patent issued to the same assignee, 3,096,343, calls for purification of aromatic carboxylic acids, particularly pyromellitic acid, by the formation of adducts of such acid with dimethyl formamide, separation of the adduct and then regeneration of the acid by breaking the adduct.

Lastly there is known U.S. Pat. 3,338,923 which indicates that the crude pyromellitic dianhydride can be purified by distillation as well as by the techniques set forth above. It contends that in order to significantly improve the color of the anhydride, it is necessary to distill but that in order to remove by-products, particularly acids or lower anhydrides, other treatments must be used. This patent shows that the color of the product is improved if the anhydride is scrubbed with a lower aliphatic or cyclo aliphatic ketone such as acetone, methyl ethyl ketone and cyclohexanone. Acetone is preferred.

Following the teachings of this art, it is agreed that all of the treatments mentioned are probably operative to improve the color and/or purity of the desired pyromellitic dianhydride end product. However it is desirable to further improve the purity and color of pyromellitic dianhydride and particularly to improve (that is, reduce) the melt color of pyromellitic dianhydride.

It is therefore an object of this invention to provide a novel purification and/or decoloration treatment for pyromellitic dianhydride.

It is another object of this invention to provide such a novel treatment which significantly reduces the color of molten pyromellitic dianhydride.

Other and additional objects of this invention will become apparent from a consideration of this entire specification, including the claims appended hereto. It should be understood that the term pyromellitic dianhydride as used herein includes mixtures of pyromellitic dianhydride and pyromellitic acid.

In accord with and fulfilling these objects, one aspect of this invention resides in scrubbing or recrystallizing pyromellitic dianhydride from an ether, suitably a mono or polyether which is in the liquid state during scrubbing and/or recrystallization. It is preferred to use a cyclic polyether such as for example 1,4-dioxane. It has been found that the use of these scrubbing materials results in much improved product color. Particularly such improvement manifests itself in the improved melt color of the anhydride product which is much lighter than that of substantially identical product purified by prior art water recrystallization alone. Water recrystallization coupled with carbon treatment gives good results but the use of a cyclic ether in accord with this invention, particularly with dioxane eliminates the need for carbon treatment.

The ether treatment of pyromellitic dianhydride, according to this invention, is carried out at about 12 to 200° C. at whatever pressure or pressure range is necessary to keep at least a portion of the ether in liquid form. It has been found to be most desirable to operate under conditions of refluxing dioxane. The ratio of dioxane to crude anhydride is suitably about 1 to 50:1, preferably about 5 to 15 parts by weight of dioxane per part of crude pyromellitic dianhydride.

The ether treatment is effective for decolorizing and purifying pyromellitic dianhydride made by substantially any oxidation and/or dehydration process. It has been found to be most effective however in the treatment of product made by the vapor phase air oxidation of durene in the presence of a vanadia-containing catalyst. The vapor phase product is condensed and then may be subjected directly to treatment with a suitable ether, according to this invention, or it may be subjected to one or more other intermediate treatment of a purifying or other nature.

This invention is illustrated by the following examples which are not limiting thereon, but which do point out the unexpected improvement obtained by the practice of this invention.

EXAMPLE 1

5.0 grams of crude impure solid pyromellitic dianhydride (PMDA) prepared by the catalytic vapor phase oxidation of durene was dissolved in 100 grams of hot refluxing dioxane and then allowed to cool to room temperature. The solid precipitate was then separated from the dioxane and dried at 140° C. until its weight was constant. 2.93 grams of material were recovered in this manner. The following analyses indicate purification was effected.

NEUTRALIZATION NUMBER

|  | Mg. NaOH/gm. | Melting point, °C. |
|---|---|---|
| Crude material | 625 | |
| Material recrystallized from dioxane | 728 | 281.5 |
| Commercially pure PMDA | 735 | 283–285 |

EXAMPLES 2–5

The following table summarizes other recrystallizations performed with crude PMDA using dioxane as the solvent. These recrystallizations were carried out as set forth in Example 1 except for the proportions of solvent and the physical properties of the crude anhydride.

| Grams | | | Neutralization number | | Melting point, °C., of product |
|---|---|---|---|---|---|
| Crude material | Dioxane refluxed | Product recovered | Crude material | Product | |
| 5.00 | 60 | 3.25 | 625 | 705 | 281.5 |
| 2.90 | 51 | 2.51 | 705 | 734 | 282 |
| 5.00 | 60 | 3.01 | 639 | 714 | 279.5 |
| 5.00 | 75 | 3.83 | 593 | 745 | 282 |

EXAMPLE 6

Crude PMDA made by the same technique as that used in Example 1 was melted by immersion of a tube containing such in a salt bath at 300–320° C. The melt color was black [Gardner 18].

A sample of the same crude material was scrubbed with acetone by the technique of Example 1 of U.S. Pat. 3,338,923 and then melted as above. The melt color was black.

A sample of the same crude material was recrystallized from hot water using a technique which formed a 15% solution of PMDA by lowering the temperature. The recrystallized product was melted as above. It was black. This procedure was duplicated using multiple recrystallizations. Upon melting the product was still black.

A sample of the same crude material was treated with refluxing 1,4-dioxane as in Example 1. Upon melting as above, this product had significantly reduced color [Gardner 10]. The product color was a light yellow.

What is claimed is:

1. Decoloration and purification of pyromellitic dianhydride produced by the vapor phase oxidation of durene by recrystallization thereof from dioxane.

2. Decoloration and purification as claimed in claim 1 carried out at about 12 to 200° C.

3. Decoloration and purification as claimed in claim 1 carried out with refluxing dioxane.

4. Decoloration and purification as claimed in claim 1 using a proportion of about 0.1 to 50 parts by weight of dioxane per part of pyromellitic dianhydride.

5. Decoloration and purification as claimed in claim 4 wherein said proportion is about 5 to 15 parts per part.

References Cited

UNITED STATES PATENTS

| 3,106,568 | 10/1963 | Spaeth | 260—346.3 |
| 3,344,152 | 9/1967 | Vanderwerf | 260—346.3 |

FOREIGN PATENTS

| 1,467,485 | 1/1967 | France | 260—346.3 |

ALEX MAZEL, Primary Examiner

B. I. DENTZ, Assistant Examiner